UNITED STATES PATENT OFFICE.

AXEL S. CARLSON, OF DENVER, COLORADO.

METAL-TEMPERING COMPOUND.

1,362,924.  Specification of Letters Patent.  Patented Dec. 21, 1920.

No Drawing.  Application filed October 1, 1919. Serial No. 327,679.

*To all whom it may concern:*

Be it known that I, AXEL S. CARLSON, a citizen of the United States, residing at the city and county of Denver and State of Colorado, have invented certain new and useful Improvements in Metal-Tempering Compounds; and I do declare the following to be a full, clear, and exact description of the invention, such as will enable others skilled in the art to which it appertains to make and use the same.

My invention relates to a metal-tempering compound, the same being more especially intended for tempering tools made of steel, such as reamers, drill steels, taps, springs and gears. My invention is particularly well adapted for tempering high-speed tools of all kinds. This compound will prevent the most delicate tools and other articles from cracking, and its effect is not only to harden, but to toughen, the material of which the tools are composed.

My compound consists of a mixture of acetic acid and saltpeter, preferably in the proportions of fifteen pounds of the acid to two pounds of saltpeter. These ingredients are mixed together by the use of seven and one-half gallons or about 62.5 pounds of water, whereby a homogeneous compound, or composition, is formed, which is at all times ready for use for tempering purposes. I prefer to employ acetic acid having a fifty-six per cent. strength.

This results in a final composition having approximately ten per cent. or four parts of acetic acid content, two-and-one-half per cent. or one part of saltpeter, and eighty-seven-and-one-half per cent. or thirty-five parts of water.

When the tools to be tempered only require that their points shall be treated, or a portion extending a short distance from their cutting extremities, these extremities are simply plunged into the liquid and supported at the necessary depth for tempering purposes. Again, if the entire article requires tempering, it is submerged in the compound. In either case the part to be tempered is left in the compound a sufficient length of time to enable it to cool. The article to be treated or tempered is heated before being subjected to treatment. Where the steel is of high quality, the temperature to which it is raised should be somewhat more than where the steel is of lower grade. In other words, the lower grade tools are required to be heated to a somewhat lower temperature than the tools or articles composed of the higher grade steel.

While I prefer to form the compound of the two ingredients mixed with the aforesaid quantity of water, and in the proportions stated, it must be understood that these proportions may be varied somewhat without materially interfering with the results obtained, though in my experience with the compound I prefer the proportions stated, but it must be understood that the invention is not limited to these precise proportions but is sufficiently comprehensive to include a compound composed of these ingredients and which will produce good results of the character heretofore indicated.

Attention is called to the fact that this compound is non-explosive under all conditions.

I claim:

1. A compound adapted for use in tempering metals, and composed of acetic acid, saltpeter and water mixed together.

2. A tempering compound, composed of acetic acid, saltpeter and water, approximately in the proportions of fifteen pounds of the acid, two of saltpeter, and seven and one-half gallons of water.

In testimony whereof I affix my signature.

AXEL S. CARLSON.